(12) United States Patent
Mayhead et al.

(10) Patent No.: US 6,367,029 B1
(45) Date of Patent: Apr. 2, 2002

(54) FILE SERVER SYSTEM TOLERANT TO SOFTWARE AND HARDWARE FAILURES

(75) Inventors: Martin Mayhead, Slough; Graham Parrington, Consett; James Radley; Gradimir Starovic, both of Slough, all of (GB)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/185,414

(22) Filed: Nov. 3, 1998

(51) Int. Cl.[7] .......................... G06F 11/36; G01R 31/28
(52) U.S. Cl. ............................ 714/2; 714/732; 709/203
(58) Field of Search ............................ 714/2, 732, 6, 714/726, 735, 738, 38; 713/179, 180; 709/203; 707/10, 103

(56) References Cited

U.S. PATENT DOCUMENTS

| | | | |
|---|---|---|---|
| 4,142,243 A | | 2/1979 | Bishop et al. |
| 4,601,033 A | * | 7/1986 | Whelan |
| 5,078,501 A | * | 1/1992 | Hekker et al. |
| 5,475,694 A | * | 12/1995 | Ivanov et al. |
| 5,761,505 A | | 6/1998 | Golson et al. |
| 6,021,491 A | * | 2/2000 | Renaud |
| 6,073,209 A | * | 6/2000 | Bergsten |

* cited by examiner

*Primary Examiner*—Gopal C. Ray
(74) *Attorney, Agent, or Firm*—O'Melveny & Myers LLP

(57) ABSTRACT

A file server system tolerant to hardware and software failures is located over a plurality of hardware nodes. The nodes of the system act as hosts for software components of the system. Several of the software components can be replicated. The replicable software components include the system file store, a checker and a logger. The replicated components have one primary copy and one or more back-up copies. Replica copies of a given replicated component are each located at different nodes. Location and handling of replica copies of a given replicable component is under the control of a replication manager which is a (non-replicable) software component of the system. The replication manager is distributed meaning it can have one of its instances running on each node of the system. These instances intercommunicate to maintain coherence. The failure detector is also distributed, its instances running on each of the nodes, and contributing to an early detection of hardware and software failures. The file store is configured to hold stored objects and includes a signature generator for computing an object-specific signature from an object. The checker comprises a signature store for holding a previously computed signature for each of the stored objects and a comparator operable to compare a signature retrieved from the signature store with a corresponding signature computed by the signature generator from an object retrieved from the file store, thus to enhance system reliability.

23 Claims, 7 Drawing Sheets

FILE SERVER SYSTEM TOLERANT TO SOFTWARE AND HARDWARE FAILURES

BACKGROUND OF THE INVENTION

The invention relates to a file server system of the kind tolerant to software and hardware failures.

Reliability of a file server system is a measure of the continuity of failure-free service for a particular system and in a particular time interval. Related to this is mean-time-between-failures which defines how long the system is expected to perform correctly.

Availability measures the system's readiness to serve. One definition of availability is the percentage of time in which the system performs correctly in a given time interval. Unlike reliability, availability depends on system recovery time after a failure. If a system is required to provide high availability for a given failure model, i.e. for a defined set of possible failures, it has to provide fast recovery from the defined set of failures.

A number of existing file servers provide an enhanced level of availability for some specific failure models. Such file servers are sometimes referred to in the art as highly-available file servers. The mechanisms which are often used for this are based on some or all of the following:

(1) primary/back-up style of replicated file service;
(2) the use of logging for faster recovery, the log being kept on disk or in non-volatile memory;
(3) checksumming to protect data integrity while the data is stored on disk or while it is being transferred between the server's nodes; and
(4) reliable group communication protocols for intra-server communication.

It is an aim of the present invention to provide a file server system which is tolerant to software and hardware failures.

SUMMARY OF THE INVENTION

Particular and preferred aspects of the invention are set out in the accompanying independent and dependent claims. Features of the dependent claims may be combined with those of the independent claims as appropriate and in combinations other than those explicitly set out in the claims.

According to a first aspect of the invention there is provided a file server system for storing data objects with respective object identifiers and for servicing requests from remote client systems specifying the object identifier of the requested object. The system comprises a file store for holding stored objects with associated object identifiers. The system further comprises a signature generator for computing an object-specific signature from an object, a signature checker comprising a signature store for holding a previously computed signature for each of the stored objects, and a comparator operable to compare, on the basis of a specified object identifier, a signature retrieved from the signature store with a corresponding signature computed by the signature generator from an object retrieved from the file store.

The location of the signature generator may be associated with the file store and the location of the comparator may be associated with the checker. If the file store is replicated, a signature generator may be provided at each file store replica location. Similarly, if the checker is replicated, a comparator may be provided at each checker replica location.

Signatures computed at the time of object storage are thus archived in the checker for later reference to provide an independent record of the integrity of the data stored in the file store. When an object is retrieved from file store, a signature for it can be computed by the signature generator and compared with the archived signature for that object. Any difference in the respective signatures will thus be an indicator of data corruption which can then be acted upon according to defined single point failure procedures, for example.

In the first aspect of the invention, the system preferably has an operational mode in which a decision is made as to whether to perform a comparison check in respect of an object on the basis of profile information for that object. Profile information may be supplied with the request being serviced and may be stored for each object or for groups of objects in the file store with profile information supplied with the request taking precedence.

According to a second aspect of the invention there is provided a file server system for storing data objects with respective object identifiers and for servicing requests from remote client systems specifying the object identifier of the requested object. The system is constituted by a plurality of replicable components which may or may not be replicated in a given implementation or at a particular point in time. The replication is preferably manageable dynamically so that the degree of replication of each of the replicable components may vary during operation. Alternatively the replication levels may be pre-set at the level of the system administrator.

Replication is handled by a replication manager. The replication manager is configured to allow for nodes leaving and joining the system by respectively reducing and increasing the number of replicas of each of the replicable components affected by the node transit. A failure detector is also provided. The failure detector is not replicable, but is preferably distributed over the system nodes by having an instance running on each node. The failure detector has an object register for storing a list of ones of the system objects and is configured to monitor for failure of any of the system objects listed in the object register and, on failure, to report such failure to the replication manager. For each system object on the failure detector list, there may be stored a secondary list of other ones of the system objects that have an interest in the health of that system object. The failure detector is then configured to report failure of that object not only to the replication manager but also to each of the objects on the secondary list. The replication manager preferably records for each of the replicated components a primary of the component concerned and is configured to select a new primary when a node hosting a primary leaves the system.

For enhanced reliability and availability, the file store is preferably replicated with a replication level of at least two, i.e. with a primary copy and at least one back-up copy. Another system component which may be replicable is a checker. The checker has a signature store for holding object-specific signatures computed for each of the objects stored in the file store.

A logger may also be provided to allow faster recovery in respect of nodes rejoining the system, for example after failure. The logger may also be replicated. The logger serves to maintain a log of recent system activity in non-volatile storage which can be accessed when a node is rejoining the system.

In the preferred embodiment, the file server system is located over a plurality of nodes, typically computers or other hardware elements. For operation, the file server system is connected to a network to which is also connected a plurality of client apparatuses that may wish to access the data stored in the file server system. The nodes of the file server system act as hosts for software components of the file server system. Several of the software components can be replicated. The replicable software components include: the system file store, a checker and a logger. The functions of these components are described further below. A replicated component has one primary copy and one or more back-up copies. Among the replicas of a given component, the primary may change through a process referred to as primary re-election, but there is only ever one primary at any one time for a given component. Generally it is desirable for reliability that replica copies of a given replicated component are each located at different nodes, or at least that the primary and one of the back-ups are located on different nodes. Thus, a given node may be host to the primaries of several different software components and to several back-ups. Location and handling of replica copies of a given replicable component is under the control of a replication manager which is a (non-replicable) software component of the file server system. The replication manager is distributed, meaning it can have one of its instances running on each node of the file server system. These instances inter-communicate to maintain coherence. Several or all of the nodes may be provided with direct network connections to the clients to provide redundancy. The network connections may be private or public.

The nodes are preferably loosely coupled. Each node is preferably provided with local storage, such as disk storage, and redundant network connections, for example a dual connection with the other nodes and a dual external connection to the network for client communication. The file server system can be implemented without any shared storage which has the advantage of making it possible to provide higher tolerance to failures.

In one embodiment of the invention, a file server system is provided which is tolerant to single point hardware and software failures, except partitioning failures. Protection can be provided against hardware component failure of a whole node, a cable, a disk, a network interface or a disk controller, and software component failure of the operating system or the file server enabling software. Software failure types for which protection can be provided includes crash, timing and omission failures, and data corruption failures internal to the file server system. All these hardware and software failures are assumed to be transient. By basing the design of the file server system on a single point failure model, as in this embodiment, the file server system performance can be improved, but there is the proviso such a system cannot handle simultaneous failure of more than one component.

In operation, a file server system of an embodiment of the invention services a write request received from a remote client and containing an object and an associated object identifier as follows: An object-specific signature is computed from the object. The object is stored in a file store together with the object identifier and the computed object-specific signature is stored in a further file store together with the object identifier. It will be appreciated that there is flexibility in the order in which these steps may be carried out. For example, the object may be stored before or after signature computation, or concurrently therewith. The file stores for the object and signatures are preferably located on different system nodes to enhance reliability. The stored signatures can be used in later checking processes whenever an object associated with a stored signature is accessed. The checking process involves performing a comparison between the stored signature retrieved from archive and a newly computed signature generated from the object retrieved from archive. For example, the file server system of this embodiment of the invention services a read request received from a remote client and containing an object and an associated object identifier as follows: In response to receipt of a read request relating to an object and specifying an object identifier for the requested object, the requested object is retrieved from file store on the basis of the object identifier and an object-specific signature is computed from the retrieved object. Concurrently, beforehand or subsequently, the archived signature for the object is retrieved from the signature file store, also on the basis of the object identifier. The newly computed signature is then compared with the old signature retrieved from archive and the subsequent request servicing then proceeds on the basis of the comparison result according to a pre-specified algorithm which may follow from a single point failure model or a multi point failure model, for example. As will be appreciated and as is described further below, the read and write request servicing algorithms can be extended according to the degree of replication of the file stores.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
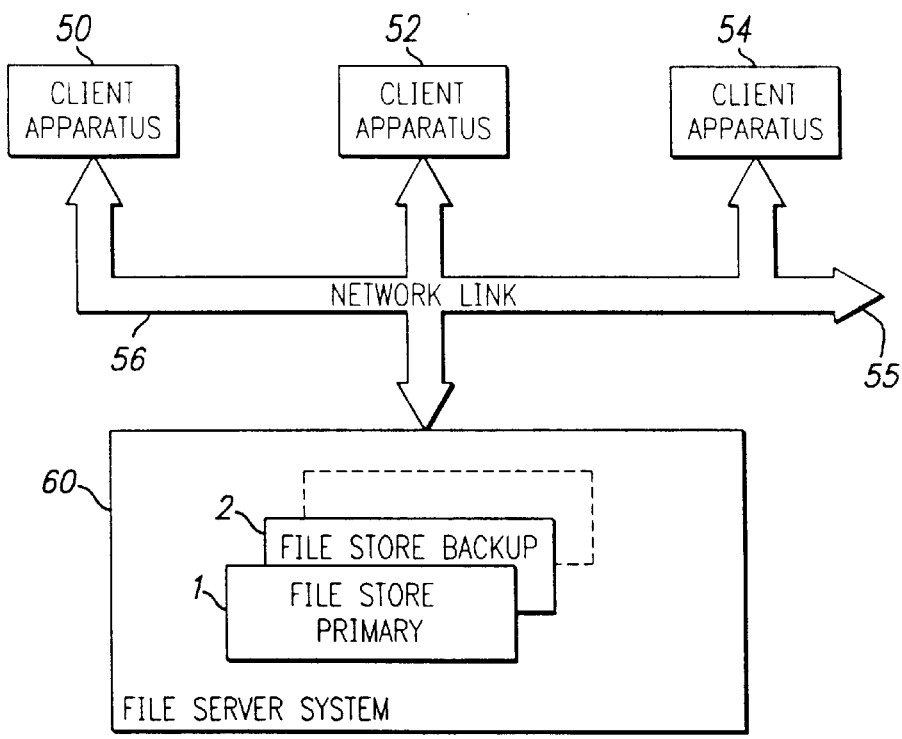
FIG. 1 is a block schematic diagram of a client-server network.

FIG. 1 is a block schematic diagram of a networked computer system showing a plurality of client apparatuses, or simply clients, 50, 52, 54 connected through a network link 56 to a file server system 60, referred to in the following as a highly-reliable (hr) file-server system, having a replicated system file store with a primary 1 and a back-up 2. A system administrator interface 55 is also connected to the network. The system administrator has the role of configuring the set-up of the hr file-server system 60. The data managed by the hr file-server system 60 are referred to as hr-objects (highly-reliable-objects) in the following. The hr-objects can be clients' real data, for example files, or some metadata, for example file attributes such as owner, modification date or the like. The hr-objects may also be a combination of data and metadata.

Figure 2:
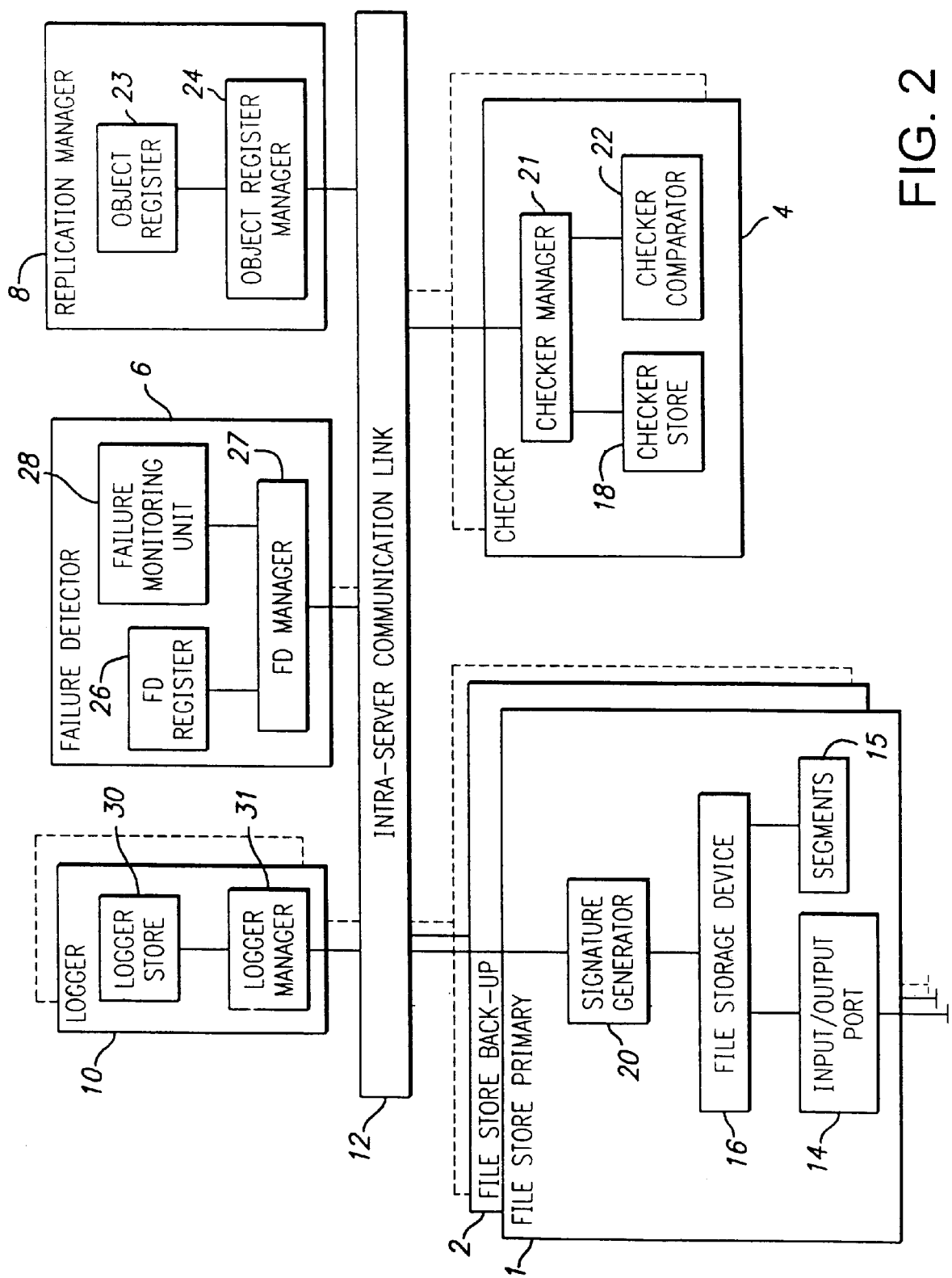
FIG. 2 is a block schematic diagram of a file server system according to an embodiment of the invention.

FIG. 2 is a block schematic diagram showing the hr file-server system 60 in more detail. The hr file-server system shown has a file store primary 1, a file store back-up 2, a checker 4, a failure detector 6, a replication manager 8 and a logger 10, all of which are interconnected by an intra-server communication link 12 for a multi-level internal transport mechanism. The multi-level internal transport mechanism comprises a request manager at a high level, a reliable group transport (RGT) at an intermediate level, and an underlying transport mechanism, such as TCP or UDP, at a low level. TCP and UDP are standard internet protocols.

The file store primary 1, referred to simply as the primary in the following description of this embodiment, is located at one node of the hr file-server system and operates according to a standard remote access file protocol for client-server communication, in this case NFS (network file system). Alternatively, another remote access file protocol could be used. The node of the primary 1 has an input/output port 14 for communication to and from client systems over the network link 56. Dual client-server connections may be provided for redundancy to enhance reliability. External communication takes place using the standard communications protocols RPC (remote procedure call), TCP/IP and UDP over IP multicast. Alternatively, other protocols could be used.

The primary 1 has a file storage device 16 in which the primary 1 stores hr-objects with associated object identifiers (object i.d.'s). The object i.d. may, for example, be 64-bits long. The primary 1 also has a signature generator 20 for computing hr-object signatures from hr-objects, typically on storage in or retrieval from the file storage device 16. The file storage device 16 includes segments 15 for storing profile information, the significance of which is discussed further below.

The node of the primary may also host a number of other services in addition to the local file system service constituted by the file store primary 1. These additional services, referred to as application services, may typically include: a standard file mounting utility for mounting file groups; a standard network lock manager (NLM) for maintaining locks on selected files for controlling concurrent accesses according to standard lock protocols; and a node status manager (NSM) for identifying restarts of client system, e.g. after failure, so that locks can be released.

The file store back-up 2 is a replica of the primary 1 located at a different node of the hr file-server system. The file store back-up 2 is referred to simply as the back-up in the following description of this embodiment. The configuration of the hr file-server system is flexible in that further file store back-ups may join the hr file-server system and others leave the system in a dynamic fashion. This possibility for further replication is indicated in the Figure with dashed lines. Moreover, as will be described in more detail further below, any of the file stores may assume the mantel of the primary and which file store is the primary may change dynamically. Since the primary and back-ups are generally located on different nodes, change of the primary (termed re-election) will generally cause a movement of the primary location from one node of the system to another.

The checker 4 comprises a manager 21, store 18 and comparator 22. The checker 4 has the function of comparing signatures it receives with corresponding signatures previously stored in the checker. The checker store 18 holds, for each of the hr-objects known to it, a signature of that hr-object together with an object identifier, which may or may not be the same as the global object identifier used by the clients. In the following, if only for the sake of linguistic simplicity, the checker store identifier and the file store identifier are taken to be the same and are both referred to as the object identifier. In other embodiments in which the identifiers are not the same, the checker will keep a correspondence table, map, algorithm or the like, for converting between file store object identifiers and checker store identifiers.

For reasons of system reliability, the checker 4 is preferably located on a node different from the node of the primary 1 and back-up 2, and possibly also the nodes on which other key software components are located. In this way, the checker 4, specifically its store 18, is at least independent of the storage devices of the primary 1 and back-up 2.

The hr-object-specific signatures may be 128 bits in length, for example, and may be computed by the primary 1 and back-up 2 by their respective signature generators.

Signatures are computed at the time when an hr-object is first to be stored in the hr file-server system, or when an hr-object already stored is the subject of a client request. In response to such a client request, the primary 1 will retrieve the requested hr-object from its file storage device and compute its signature. The primary will then issue a check request to the checker 4.

Check requests are transmitted to the intra-server communication link 12 with multicast commands. A multicast is a single send operation performed at a sender to send a message to a number of receivers. (A broadcast is a special case of a multicast when a message is sent to all receivers). The check request specifies the object i.d. and the newly calculated object signature. The check request is serviced by the checker manager 21 where it is passed to the checker comparator 22. The comparator 22 retrieves the object signature stored in the checker store 18 for the object i.d. specified in the multicast command and then compares the retrieved signature with the newly calculated one. Depending on whether the two signatures match or not, a result EQUAL or DIFFER is transmitted by the checker manager 21 onto the intra-server communication link 12 using another multicast command. In the event that the signatures differ, the multicast command also includes a copy of the retrieved signature.

The checker manager 21 is configured to monitor all requests which modify hr-objects, i.e. data or metadata of hr-objects. Moreover, intra-server communication is performed so as to ensure that the checker observes such requests in the same order as they are observed by the primary, back-up and any further back-ups.

The involvement of the checker 4 can be enabled/disabled at the level of a single request type so that checking can be performed selectively. For this purpose the system maintains a profile for each hr-object, and optionally also for a whole file system, i.e. a group of hr-objects. The object profiles are stored in respective portions 15 of the file store storage devices 16. The profiles contain control information. One part of the control information specifies whether the checker is to be used when operations are performed on the hr-object concerned. In addition, individual client requests on an object, such as read requests or write requests, can specify profile data specific to the request, such as control information. For example, a client request may contain control information specifying that no checking be performed in servicing the request. The request's profiling data will then override the profiling information stored for the hr-object being operated on. Initially, the object profiles are initialized by the clients using the administrator interface 55.

Subsequently, the profiles are initialized by the clients in each request which is submitted to the hr file-server system.

The replication manager 8 controls the number and location of replicas for the replicated services, in this embodiment the file store replicas 1 and 2. In general, a non-replicated service is defined as code running as a single process on a single node of the server system which provides a client service such as a file access (by NFS in the present embodiment) or a lock service (by NLM in the present embodiment). In the case of replicated services, each replica is a member of the replicated service. All members of the same replicated service support the same interface. The replication manager is non-replicable, but each node has running on it an instance of the replication manager. The replication manager is thus distributed over the nodes of the hr file-server system, with the instances continually intercommunicating to maintain coherence, e.g. to keep track of which components are replicated, how many replicas currently exist and, for each replicated component, which replica is currently the primary.

The replication manager 8 has an object register 23 in which any of the hr-objects of the hr file-server system may be registered. Management of the object register 23 is under the control of an object register manager 24 of the replication manager 8. Under the control of the object register manager 24, hr-objects may be registered and deregistered, typically on request from that hr-object. The object register 23 also stores, for each register entry, information on any group affiliation of that hr-object. Object groups are used for replica copies of hr-objects. The group affiliation may be deleted or amended on request of the hr-object. Moreover, within a group, one of the replicas will be a primary and this will be registered with the replication manager. Change of the primary replica of the group (re-election) is also allowed for.

Figure 3:
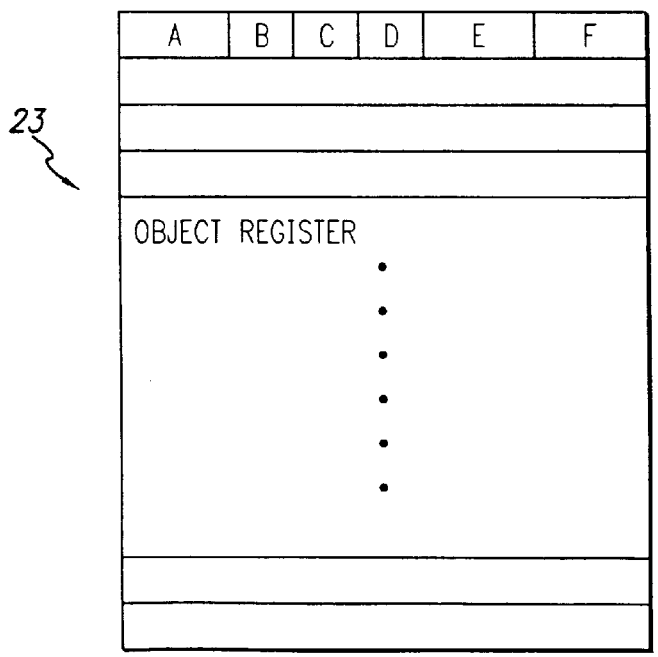
FIG. 3 shows a data structure used in the replication manager of the embodiment of FIG. 2.

FIG. 3 shows an example of the data structure of an object register entry. Each entry record includes an object identifier field A, an object location address field B, and a number of fields C through F related to group affiliation of the hr-object. Field C is for a group identifier. Field D is for recording the number of replicas in the group (possibly zero). Field E is for recording whether the hr-object is the group primary or not. Field F is for addresses or pointers to the locations of other group members (if any).

The flexible structure of the object register 23 managed by the object register manager 24 allows for the creation of new replicas so that the degree of replication of any one of the services can be increased and decreased dynamically according to current requirements, and independently of the replication of other services. For example, services and nodes can leave the system (i.e. be taken down) by failures or for maintenance, and will rejoin the system (i.e. come up again) after repair, upgrading or whatever. Nodes leave and join the system as groups of hr-objects.

In general, any service, apart from the replica manager itself, is amenable to replication, in which case there will be a single primary and one or more back-ups. Generally, there is no ranking among back-ups.

If a service is replicated, a special asynchronous mode can be selected at the level of a single request type, for example for read file data requests. In the asynchronous mode the working of the primary is not synchronized with the working of the back-up, or back-ups, in so far as servicing the request concerned. More specifically, this means that on receipt of a request the primary forwards the request to the back-ups and then immediately continues by performing the operation and replying to the client. By contrast, in the normal synchronous mode, after forwarding a client request to the back-ups, the primary will wait for replies from the back-ups before replying to the client.

The asynchronous mode thus allows a gossip style of replication in which the primary does not wait for the replies from the back-ups and the back-ups do not reply to the primary. The request information thus spreads from the primary to the back-ups in the background while the primary is performing actions to service the request. Because the primary does not wait to check whether the back-ups have received the request information, a greater degree of parallelism is provided, at the expense of possible external inconsistency. A requester may receive some replies and then access some pre-request data if there was a failover or switchover of the primary in the meantime. A primary failover or switchover is a change of primary effected with a primary re-election and will occur after a primary fails, for example.

The algorithm applied by the replication manager 8 to ensure replica coordination will proceed as follows if there are no failures.

The primary receives a new client request for a specific service. The request may come directly from the client over the network link 56 or via one of the back-ups. (Back-ups may be connected directly to the network and may then receive client request. New requests will be recognized as such by the back-ups and forwarded to the primary). The primary prepares for execution of the request by performing consistency and accessibility checks, and by computing signatures for the hr-objects specified in the request. The replication manager informs the logger and checker of the request. (The logger and checker referred to here will be the primary logger and primary checker in the case that the logger and checker are replicated). The logger then creates a log entry and the checker checks the request's signatures. After this has been successfully completed, the primary of the service to be replicated forwards the replication request to any back-ups it may have. The back-ups then perform the request and inform the primary of the outcome. If all outcomes are successful, the primary performs the request locally, for example by retrieving or updating the stored file data, and then replies to the original requester, i.e. the client, returning the result of the requested operation.

The failure detector (FD) 6 comprises a manager 27, a register 26 and a failure monitoring unit 28. A failure detector is provided at each node. The failure detector register 26 is a register of hr-objects which have previously registered with the failure detector. There are two types of registration. A first type is registration by an object that its future health be monitored actively or passively by the failure detector 6. A second type is registration by a hr-object of its interest in being notified of any future failure in another hr-object. The other hr-object specified in any type-two registration must itself be registered with the failure detector with a type-one registration. The FD manager 27 has facilities for registering and deregistering entries, similar to those provided for the replication manager register. The FD manager 27 is configured to monitor activity of hr-objects which are registered with the replication manager 8 through the failure monitoring unit 28. Some or all of the monitoring may be carried out passively, for example by monitoring traffic on the intra-server communication link 12 between other server elements or by waiting for receipt of periodic notifications from registered objects regarding their health status. Active monitoring may also be used, either on its own or in combination with passive monitoring. Active monitoring can take the form of the failure detector periodically polling the registered hr-objects to request health status information. A failure can be determined if there is no response to a poll or if there are no periodic health status messages within a given timeout period. Monitoring may also include acting on messages from the checker 4 indicating that failure of an object is suspected on the basis of recent checking activity carried out by the checker 4. Specifically, the failure detector 6 is configured to monitor signature disagreements which it does by watching for multicast commands issued from the checker and noting any such commands with a DIFFER result.

The failure detector 6 is also responsible for reporting failures to other hr-objects which have registered at the failure detector their interest in such events. Specifically, replica failures will be reported to the replication manager 8 so that the object register can be updated, for example to reduce the number of replicas in the relevant group by one. If the failed replica is a primary, the replication manager 8 will then initiate a reconfiguration of the corresponding group of replicas, i.e. the members of that replica group. During the reconfiguration phase the service will not accept any new requests. At the end of the reconfiguration phase a new primary will be elected.

As well as notification of the replication manager 8, the failure detector will also notify an hr-object failure to any other hr-objects which have previously registered at the failure detector their interest in the health of the now failed hr-object.

The request manager is a high level component of the multi-level transport mechanism utilizing the intra-server communication link 12. The request manager serves to handle requests from client systems at a high level and is responsible for calling the target server hr-object (primary and back-ups), logger, checker and replication manager, as required to service the request concerned. Each client request has a unique request identifier for distinguishing it from all other client requests (sometimes called invocations). The request identifiers may be allocated by the request manager or at a lower level by the protocol used for the client-server communications, e.g. RPC over TCP or over UDP. The request identifier includes the originator object identifier and is augmented with additional data such as a time stamp and/or a node identifier specific to the location of the requesting client system. A request manager is provided at each node.

The reliable group transport is a component of the multi-level transport mechanism having a level intermediate between the request manager and the low level communication protocols used. The reliable group transport is a communication protocol used to control communication on the intra-server communication link 12. There are many suitable reliable group transport protocols in existing use, any of which can be used. The reliable group transport provides a reliable ordered transport mechanism having at least FIFO (first-in-first-out) order between a single sender and multiple receivers. The reliable group transport together with the failure detector 6 and replication manager 8 may be considered collectively to form a replication framework used for controlling the replicated services.

The logger 10 maintains a redo, write-ahead memory log of the client system requests in a logger store 30 under the control of a log manager 31. The logger 10 preferably runs on a node different from the file store nodes. Each log entry or record stores information about one client request, specifically an identifier, arguments and results when finished.

Each log record is a log object. The operation of the logger is conducted on the log objects. An identifier for the log object is created the first time the log object is recorded.

A log object can be, for example, a representation of a hr-object, a part of the object state which a hr-object wishes to have saved in the log, or a client request as received by the request manager if the request manager decides to have the client request logged. The log manager 31 has a mechanism for translating request identifiers into log object identifiers and for translating a hr-object identifier into a log object identifier.

The involvement of the logger 10 can be enabled/disabled at the level of a single request type so that logging can be performed selectively. The log can be implemented as a journal with new entries appended to the end of the journal. Operations are provided for setting the current position in the journal, for updating a log entry, for deleting a log entry and for retrieving a log entry. A mechanism can also be provided for periodically compacting the log.

The log is used when a node rejoins the system. When a node is rejoining the system, for example after a failure, it first obtains the log from one of the active nodes. It then applies those entries which it has not seen and joins the system, obtaining the latest state from the active node.

The logger 10 may be replicated and as such may come under the control of the replication manager 8.

One convenient implementation of the embodiment is based on an existing Java or C++ object-oriented environment with compiler and runtime libraries, extended to provide support for the checking, logging, failure detection, replication management and other functions described above.

In operation, the file server system of the embodiment of FIG. 2 services client read and write requests for a hr-object in the manner now described with reference to FIGS. 4 to 8 which are state diagrams showing the activity of the client, primary, back-up and checker during the servicing of read and write requests. FIGS. 4 through 7 relate to read requests and show the activity for four different situations defined by the results of signature comparisons performed by the back-up and checker in the course of servicing the client read request. FIG. 8 shows the activity during the servicing of a write request. In each of FIGS. 4 through 8, the steps performed in the course of the request servicing are labeled numerically. In the following description, paragraphs are marked with the same numbering.

Figure 4:
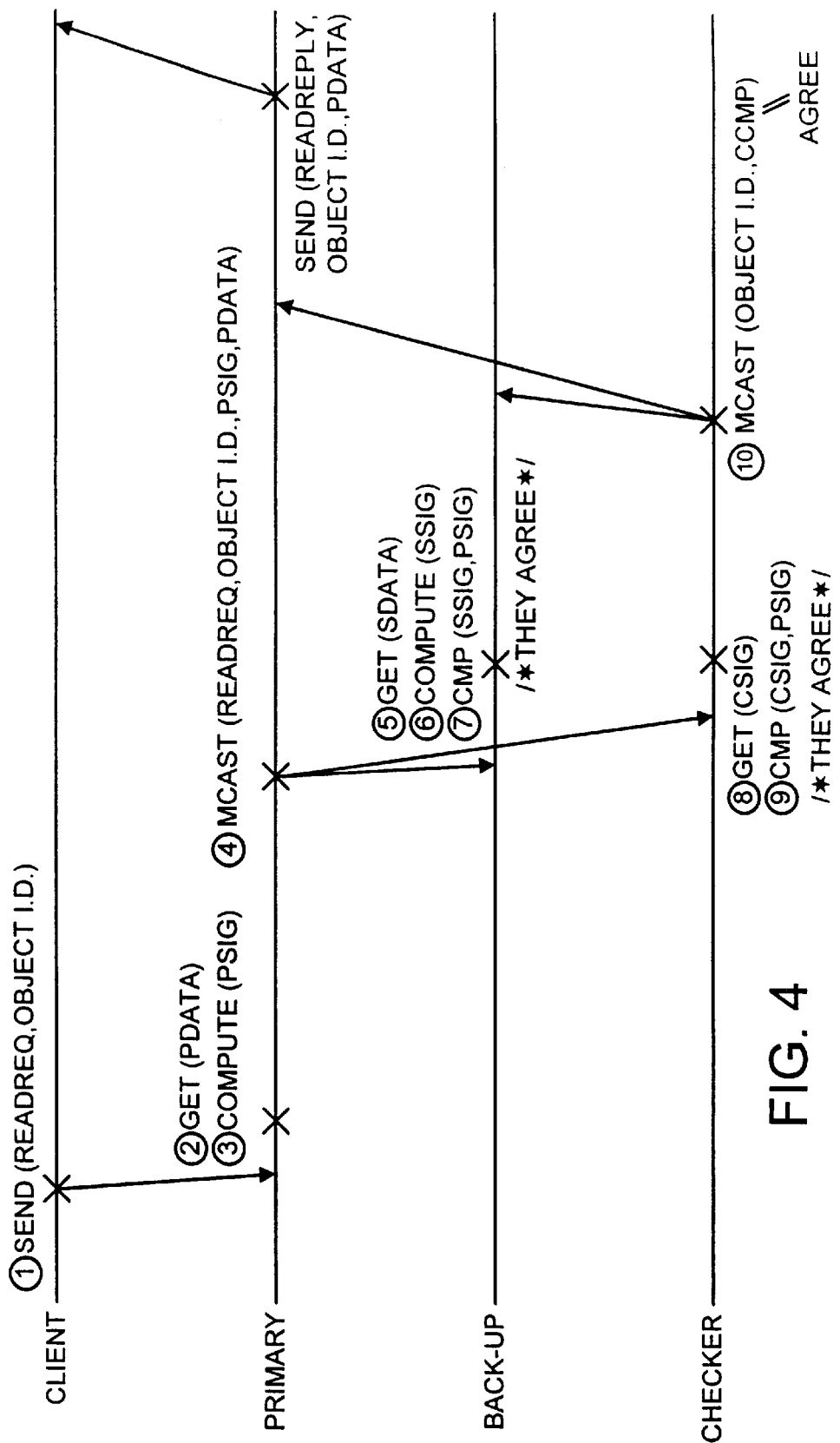
FIG. 4 is a state diagram showing how a client read request is serviced when the primary, back-up and checker all agree.

FIG. 4 shows how the client read request is serviced when the checker, primary and back-up all agree.

1. The client transmits a request to read data to the hr file-server system, specifying the object i.d. of the hr-object being requested and the command identifier. The client request command, send(readreq, object i.d.), is routed by the client server system only to the primary. (In an alternative configuration, the client request could be sent to the primary and back-up).

2. In response to receipt of the read request, the primary retrieves the hr-object data, pdata, from its file storage device by issuing a command get(pdata).

3. On the basis of the retrieved data, the primary computes a signature, psig. The signature is then logged by the logger, although this is not shown in the Figure for the sake of clarity.

4. With a multicast command, mcast(readreq, object i.d., psig, pdata), the primary transmits the signature computed from the data retrieved from its storage device, together with the object i.d., command identifier and pdata, to the back-up and checker.

5. In response to receipt of the multicast command, the back-up retrieves the hr-object data, sdata, from its file storage device by issuing a command get(sdata).

6. On the basis of the retrieved data, the back-up computes a signature, ssig.

7. The back-up compares the signatures of the primary and back-up with a command cmp(ssig, psig). The comparison has a boolean result scmp=AGREE/DIFFER. In the present example, scmp=AGREE since the primary and backup signatures are the same.

8. In response to receipt of the multicast command from the primary, the checker retrieves the signature, csig, corresponding to the specified object i.d. from its store by issuing a command get(csig).

9. The checker compares the signatures of the primary and checker with a command cmp(csig, psig). The comparison has a boolean result ccmp=AGREE/DIFFER. In the present example, ccmp=AGREE since the primary and checker signatures are the same.

10. The checker issues a multicast command, mcast (object i.d., ccmp) with ccmp=AGREE, to transmit the check result to the primary and back-up.

Finally, in response to receipt of the check result, the primary transmits the data retrieved from the primary to the client with a command, send(readreply, object i.d., pdata), to service the original client read request.

Figure 5:
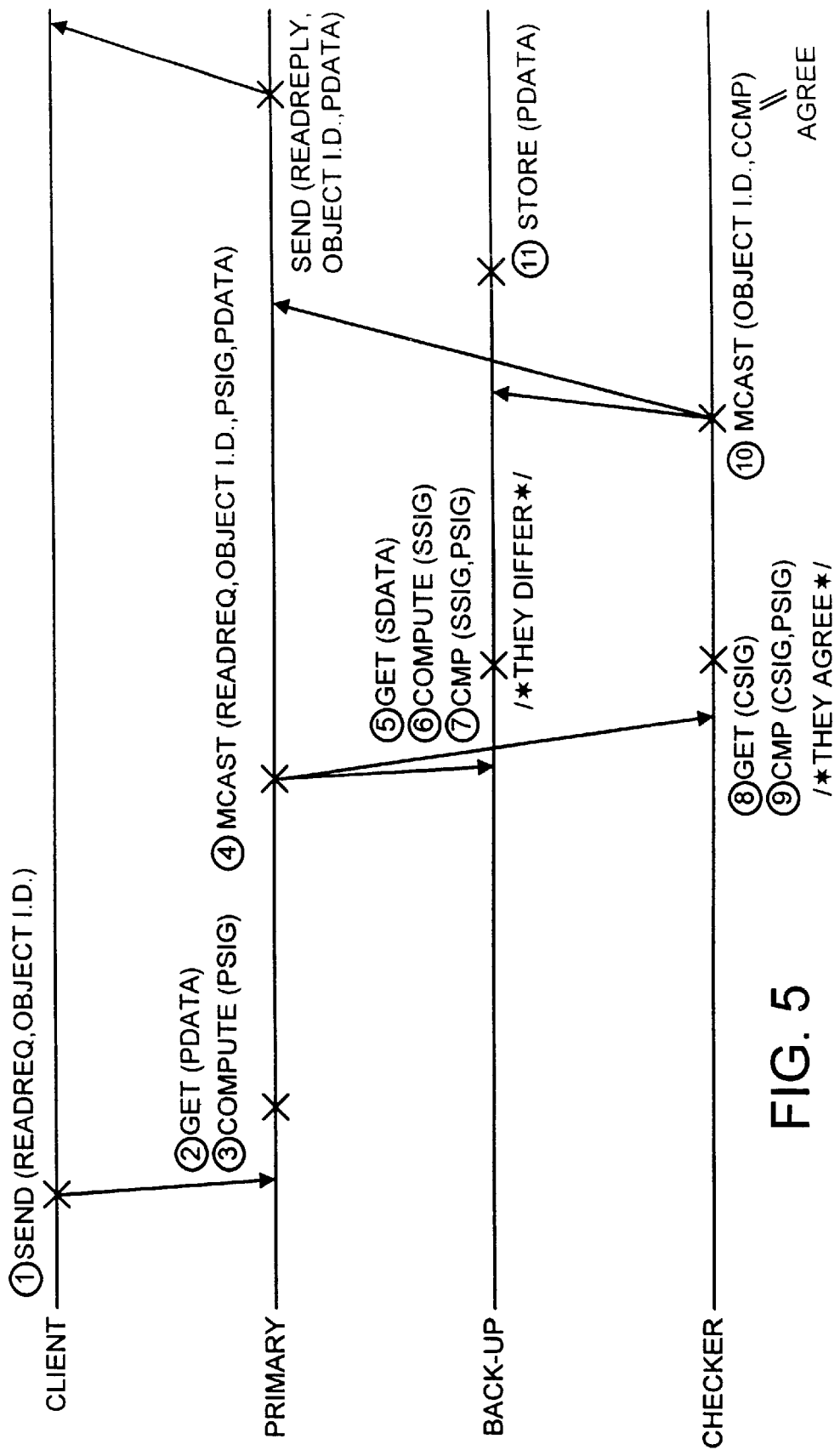
FIG. 5 is a state diagram showing how a client read request is serviced when the checker and primary agree, but the primary and back-up disagree.

FIG. 5 shows how the client read request is serviced when the checker and primary agree, but the primary and back-up disagree.

1–10. Steps 1 to 10 proceed as described above with reference to FIG. 4, the only difference being the result of the comparison performed by the back-up in Step 7 which is that the signatures of the primary and back-up disagree, scmp=DIFFER. In this example the multicast conveys the result, ccmp=AGREE, from which the back-up infers that the primary's data (pdata) for the requested hr-object is valid, but its own data (sdata) is corrupt. The back-up then proceeds to write over its data with the data from the primary in Step 11 now described:

11. The back-up stores the data from the primary in the back-up with the command store(pdata). The back-up marks the file as correct (not shown).

Finally, the hr-object data is transmitted to the client by the primary as in the case of FIG. 4.

Figure 6:
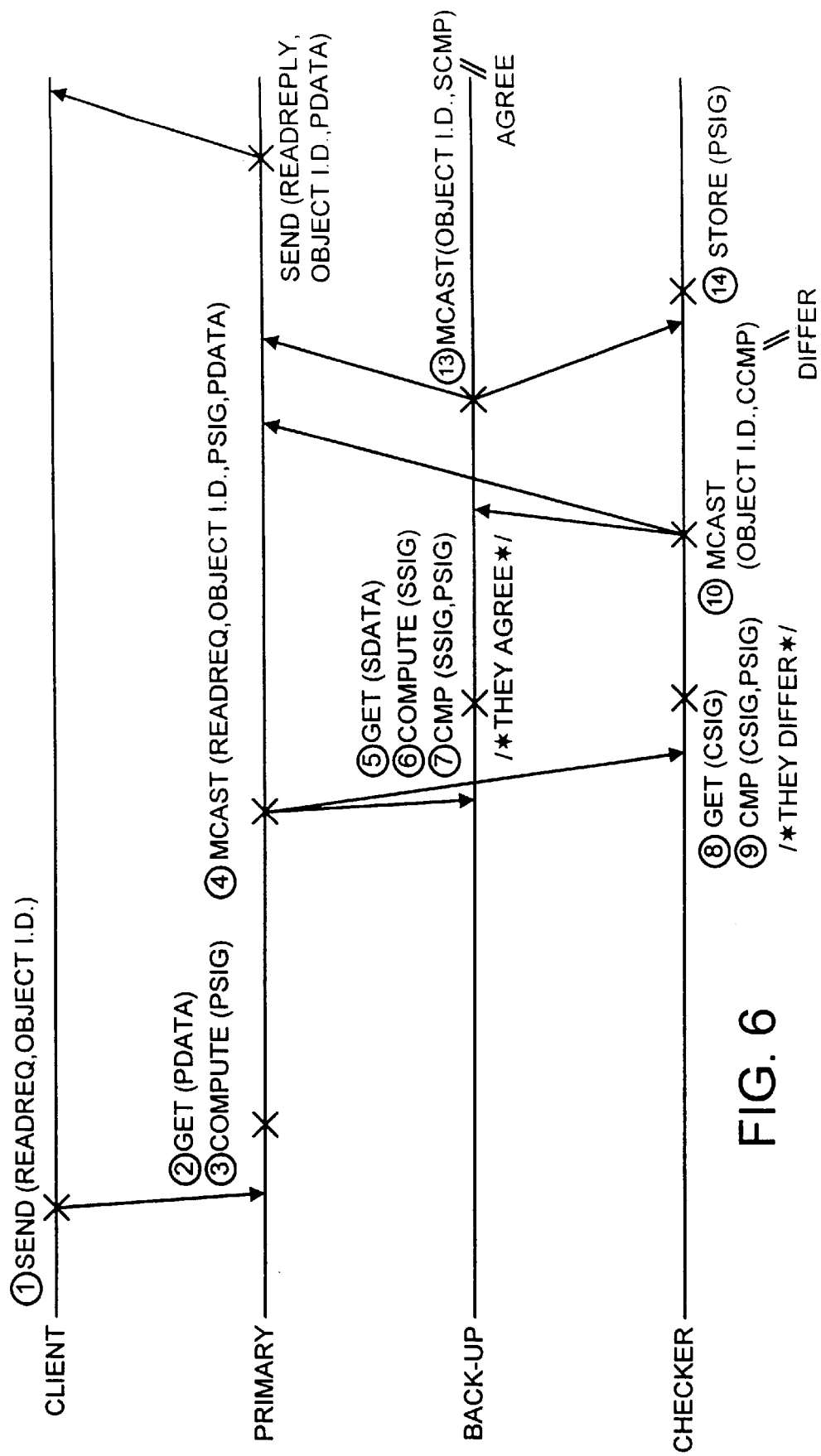
FIG. 6 is a state diagram showing how a client read request is serviced when the checker and primary disagree, but the primary and back-up agree.

FIG. 6 shows how the client read request is serviced when the checker and primary disagree, but the primary and back-up agree.

1–10. Steps 1 to 10 proceed as described above with reference to FIG. 4, the only difference being the result of the comparison performed by the checker in Step 9 which is that the signatures of the primary and checker disagree, ccmp=DIFFER. In this example, the multicast of Step 10 thus conveys the result, ccmp=DIFFER, which is handled as follows:

13. The back-up takes receipt of the result ccmp=DIFFER in combination with its own comparison result scmp=AGREE as a prompt to issue a multicast of the result of its comparison scmp=AGREE.

14. Receipt of the back-up result indicating that the primary and back-up signatures agree, is taken by the checker to infer that the signature held in its store for the requested hr-object is corrupt. The checker thus overwrites its stored signature with the signature calculated by the primary with a command store(psig).

Finally, receipt of the back-up result indicating that the primary and back-up signatures agree, is taken by the primary to infer that its data (pdata) and the back-up's data (sdata) of the requested hr-object are both valid. The primary then proceeds to transmit the data retrieved from the primary to the client with a command, send(readreply, object i.d., pdata) thereby servicing the original client request.

Figure 7:
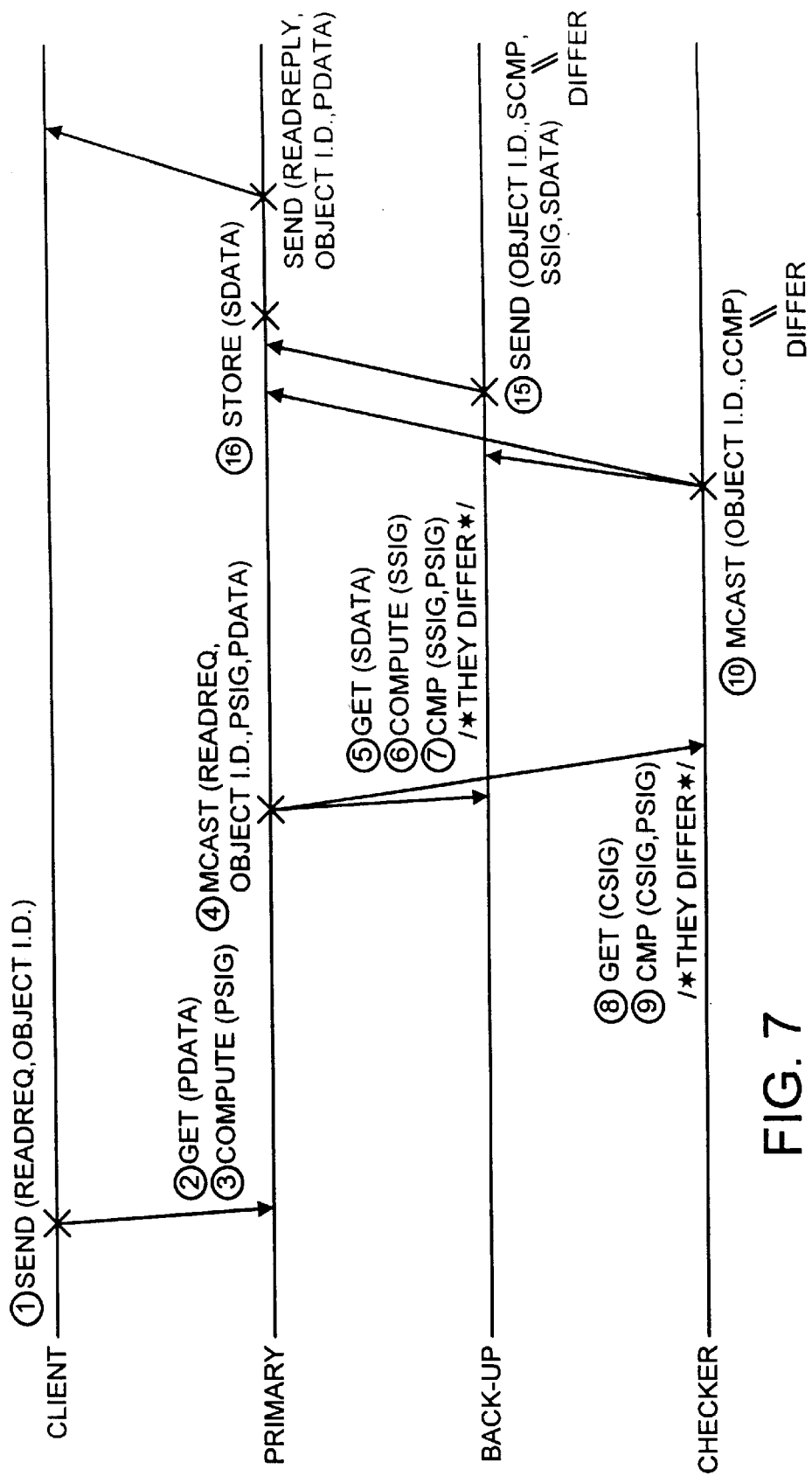
FIG. 7 is a state diagram showing how a client read request is serviced when the primary and checker disagree and the primary and back-up disagree.
Figure 8:
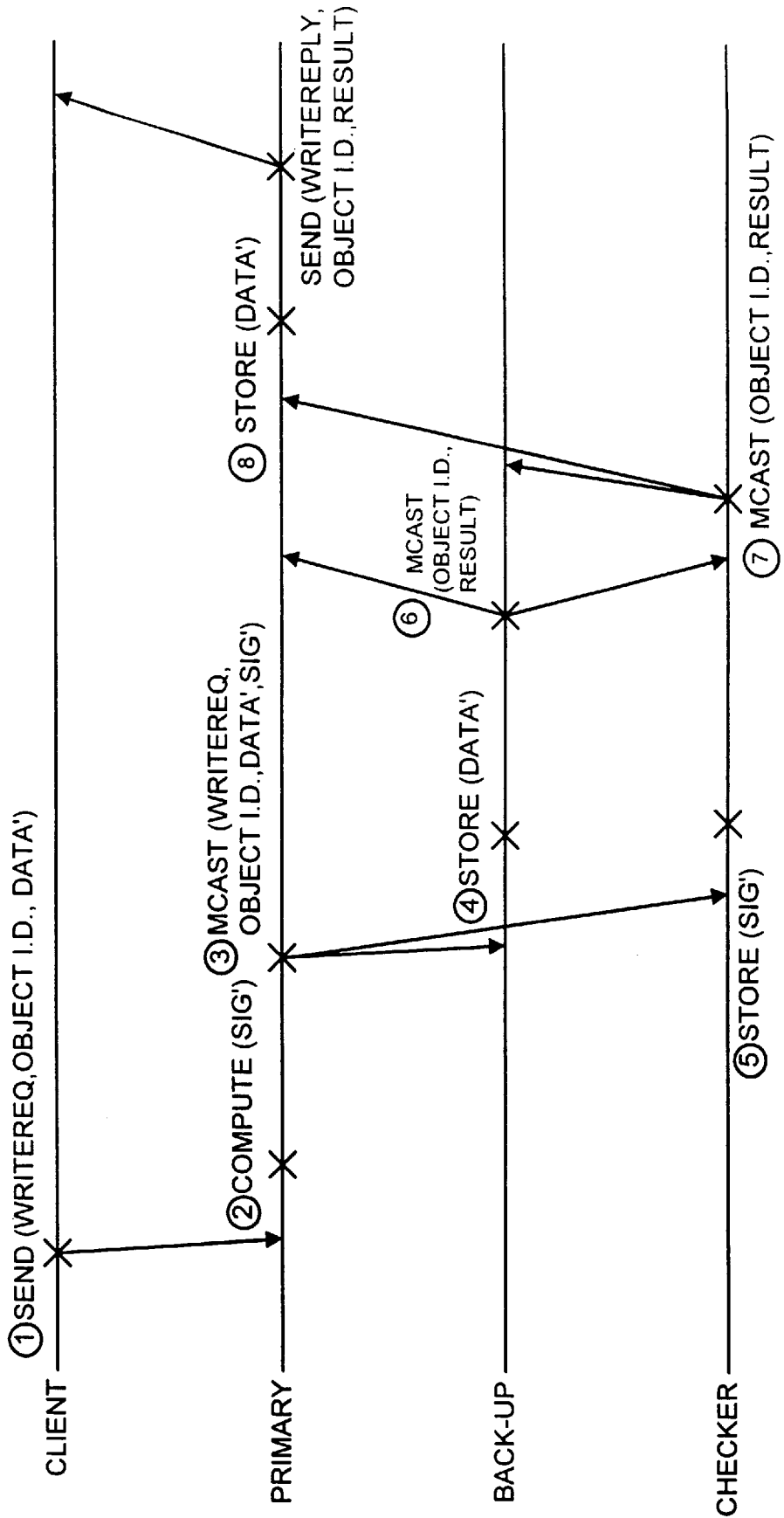
FIG. 8 is a state diagram showing how a client write request is serviced.

FIG. 7 shows how the client read request is serviced when the primary and checker disagree and the primary and back-up disagree. In these circumstances, the back-up and checker are deemed to agree, since the system is designed to be tolerant of a single failure only.

1–10. Steps 1 to 10 proceed as described above with reference to FIG. 4, the only differences being the results of the comparisons performed by the back-up in Step 7 and the checker in Step 9. Namely, in Step 7, the signatures of the primary and back-up are found to disagree, scmp=DIFFER. Moreover, in Step 9, the signatures of the primary and checker are also found to disagree, ccmp=DIFFER.

15. The back-up takes receipt of the result ccmp=DIFFER in combination with its own comparison result scmp= DIFFER as a prompt to send its data, signature and comparison result to the primary with a command send(object i.d., DIFFER, ssig, sdata).

16. On receipt of this command from the back-up and the comparison result of the checker (see Step 10), the primary infers that its data is corrupt and overwrites it with the back-up's data with a command store(sdata).

To service the client read request, the primary sends the back-up data to the client with a command send(readreply, object i.d., sdata).

From the above description of FIGS. 4 to 7, it will be appreciated that, the multicasting from the checker and back-up of their comparison results to each other and to the primary, allows each of the primary, back-up and checker to decide which one (if any) should be deemed to be faulty and to take consequent remedial action. As will be appreciated, these procedures are based on the assumption that there is only a single failure at any one time.

FIG. 8 shows how a client write request is serviced.

1. The client transmits a request to write data to the hr file-server system, specifying the command identifier, the object i.d. of the hr-object and the object data. The client request command, send(writereq, object i.d., data'), is routed by the client server system only to the primary. (In an alternative configuration, the client request could be sent to the primary and back-up).

2. The primary computes a signature from the data to be written (data') with a command compute(sig').

3. With a multicast command, mcast(writereq, object i.d., data',sig'), the primary transmits the new data and signature, together with the object i.d., to the back-up and checker.

4. The back-up stores the new data, overwriting the old if the object has previously been stored, with a command store(data').

5. The checker stores the new signature, overwriting the old if the object has previously been stored, with a command store(sig').

6. A multicast command mcast(object i.d., result) is transmitted from the back-up indicating the result that the new data has been stored.

7. A multicast command mcast(object i.d., result) is transmitted from the checker indicating the result that the new signature has been stored.

8. The primary stores the new data with a command store(data').

Finally, a write reply is sent to the client indicating the outcome of the write with a command send(writereply, object i.d., result).

In the above description of FIGS. 4 through 8, the get and store commands have merely specified data. However, under the NFS system, for example, the object will be made up of two components, namely attributes and data, which will be stored separately. In general, read and write request servicing can involve operating only on attributes or only on data, or operating on both attributes and data. The signature for each object may also be subdivided into a part for the attributes and a part for the data, and comparisons may be performed between those part signatures. Furthermore, under NFS, if operation is proceeding in the asynchronous mode, following store commands the attributes or data may not be written to disk until later, after completion of the request servicing. In the case of write requests relating to objects already stored, the servicing may be further optimized by retrieving existing object data and attributes for the object concerned and performing comparisons as for read requests. Still further, if the request servicing is modified by allowing client requests to be received by the back-up as well as the primary, the servicing may be further optimized. For example, in the case of read requests, the requested object may be retrieved from store and its signature computed (Steps 5 and 6) prior to the back-up's receipt of the multicast command from the primary (Step 4).

In the above embodiment, the checker store identifier and the file store identifier were taken to be the same and were both referred to as the object identifier. However, in another embodiment, the checker operates with a distinct checker store identifier which is an object of the checker, or checker object. The first time a signature computed as a result of a client request, or the signature of an object, is to be stored in the checker, the checker creates a checker store identifier for that hr-object. Subsequently, the checker will accept requests that specify the checker store identifier (i.e. the checker object) and signature to be checked. In response to such a request, the checker will compare the signature provided with the locally stored signature and reply to the caller with a status (EQUAL/DIFFER) and if different then also the locally stored signature.

As previously mentioned, one or more back-ups may be connected directly to the network and may then receive client requests directly.

In further embodiments, the file store back-up 2 could be omitted to provide a lower specification system, as could any one or more of the checker 4, replication manager 8, logger 10 and failure detector 6. Equally, more than one back-up, i.e. multiple back-ups, could be provided. It is also possible to provide multiple replicated checkers or loggers. These elements may be replicated to any desired degree, either statically or dynamically under the control of the replication manager. The elements amenable to replication are shown in FIG. 2 with a replica copy in dashed lines.

It will be appreciated that although particular embodiments of the invention have been described, many modifications/additions and/or substitutions may be made within the spirit and scope of the present invention as defined in the appended claims.

What we claim is:

1. A file server system for storing data objects with respective object identifiers and for servicing requests from remote client systems specifying the object identifier of the requested object, the file server system comprising:

a file store configured to hold stored objects with associated object identifiers, wherein said file store includes at least a primary copy and a back-up copy;

a signature generator for computing an object-specific signature from an object; and a signature checker comprising a signature store for holding a previously computer signature for each of the stored objects and a comparator operable to compare, on the basis of a specified object identifier, a signature retrieved from the signature store with a corresponding signature computed by the signature generator from an object retrieved from the file store, wherein the primary copy of the file store, the back-up copy of the file store, and the signature checker are located at different nodes of the system.

2. A system according to claim 1, wherein the signature of each of the stored objects is held in the checker together with a checker store identifier for the signature concerned.

3. A system according to claim 2, wherein the checker store identifiers are derived from the respective object identifiers.

4. A system according to claim 2, wherein the object identifiers are used as the checker store identifiers.

5. A system according to claim 1, the file store and the checker being interconnected to transmit and receive signals from each other through an ordered transport link.

6. A system according to claim 5, wherein the ordered transport link has at least FIFO order between a transmitting one of the file store and the signature checker, and at least one receiving one of the file store and the signature checker.

7. A system according to claim 1 configured to be responsive to profile information associated with data objects of the system.

8. A system according to claim 7 operable to determine whether to perform a signature comparison check in respect of a data object on the basis of the profile information associated with that object.

9. A system according to claim 7 and having an operational mode in which requests from remote client systems are analyzed for profile information contained within the request and the profile information is used to decide whether to perform a signature comparison check with the checker in respect of the object specified in the request.

10. A system according to claim 7, wherein the file store is configured to hold profile information for the stored objects and the system is operable to analyze requests from remote client systems in respect of profile information and to use that profile information to decide whether to perform a comparison check with the checker in respect of the object specified in the request, wherein, if it is decided not to perform a comparison check on the basis of the profile information contained within the request, the file store is searched for profile information for the object specified in the request, the profile information held in file store for that object then being used to decide whether to perform a comparison check with the checker in respect of the object specified in the request.

11. A system according to claim 7 operable to determine whether to replicate a request from a remote client on the basis of the profile information associated with the request concerned.

12. A system according to claim 11 having an asynchronous mode and a synchronous mode of request replication, the replication mode being selected on the basis of the profile information.

13. A system according to claim 7, comprising a logger for maintaining a log of recent system activity in non-volatile storage, the system having an operational mode in which requests from remote client systems are analyzed for profile information and the profile information is used to decide whether to effect a log entry in the system log in respect of the request concerned.

14. A file according to claim 1, further comprising a replication manager and a failure detector, and wherein the file store, signature checker and signature generator are replicable components, replicable under control of the replication manager, wherein replicas of a given replicated component are distributed over a plurality of system nodes, the replication manager being configured to allow for nodes leaving and joining the system by respectively reducing and increasing the number of replicas of each of the replicable components affected, and the failure detector being distributed over the system nodes by having an instance located at each system node, the failure detector having an object register for storing a list of system objects and being configured to monitor for failure of any of the system objects listed in the object register and, on failure, to report such failure to the replication manager.

15. A file server system for storing data objects with respective object identifiers and for servicing requests from remote client systems specifying the object of the requested object, the file server system comprising:
- an intra-server communication link;
- a replication manager connected to said communication link;
- a failure detector connected to said communication link; and
- a plurality of replicable components, wherein for the purpose of improving system reliability and availability:
  - the replicable components are distributed over a plurality of system nodes;
  - the replication manager is configured to allow for nodes leaving and joining the system by respectively reducing and increasing the number of replicas of each of the replicable components affected; and
  - the failure detector is distributed over the system nodes by having an instance of the failure detector located at each system node, the failure detector having an object register for storing a list of system objects and being configured to monitor for failure of any of the system objects listed in the object register and, on failure, to report such failure to the replication manager.

16. A system according to claim 15, wherein for each system object for which there is an object register entry there is stored in the object register as a part of that entry a secondary list of other ones of the system objects that have an interest in the health of that system object, the failure detector being configured to report failure of that object also to each of the objects on the secondary list.

17. A system according to claim 15, wherein one of the replicable components of the system is a file store for storing data objects with respective object identifiers.

18. A system according to claim 17, wherein the replication manager is configured to maintain at any one time at least two replicas of the file store on respective nodes of the system.

19. A system according to claim 17, wherein one of the replicable components of the system is a checker, the checker having a signature store for holding object-specific signatures computed for each of the objects stored in the file store.

20. A system according to claim 19, wherein the file store has a signature generator for computing said signatures and wherein the checker includes a comparator operable to compare, on the basis of a specified object identifier, a signature retrieved from the signature store with a corresponding signature computed by the signature generator from an object retrieved from the file store.

21. A system according to claim 15, wherein one of the replicable components of the system is a logger for maintaining a log of recent system activity in non-volatile storage and the replication manager is configured to access the log when a node is rejoining the system.

22. A method of servicing a write request from a remote client by a file server system, the method comprising the steps of:
- receiving a write request containing an object and an associated object identifier;
- computing an object-specific signature from the object;
- storing the object in a back-up file store together with the object identifier;
- storing the computed object-specific signature in a signature checker file store disposed remotely from the back-up file store together with the object identifier; and
- storing the object in a primary store disposed remotely from at least one of the back-up file store and checker file store after the previous storing steps are complete.

23. A method of servicing a read request from a remote client by a file server system, the method comprising the steps of:
- receiving a read request relating to an object and specifying an object identifier for the requested object;
- retrieving the object from a file store on the basis of the object identifier;
- computing an object-specific signature from the retrieved object;
- retrieving a further object-specific signature for the object from a further file store on the basis of the object identifier;
- comparing the computed signature with the retrieved signature; and
- completing servicing of the read request on the basis of the comparison result.

* * * * *